Johnson, Jr & Goodell,
Evaporating App's.
No. 108,793.  Patented Nov. 1, 1870.
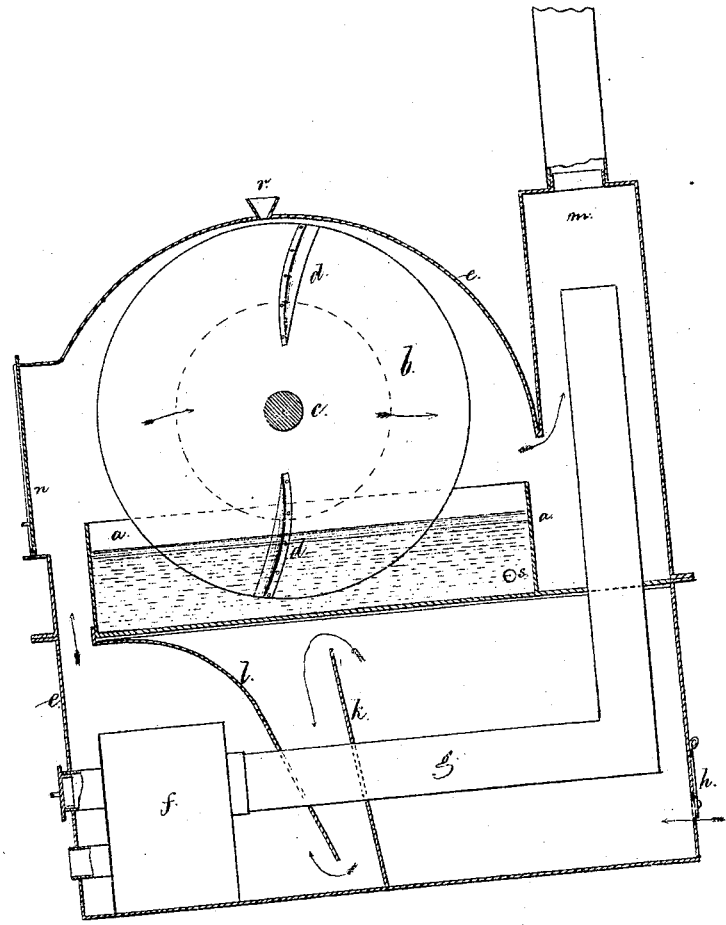
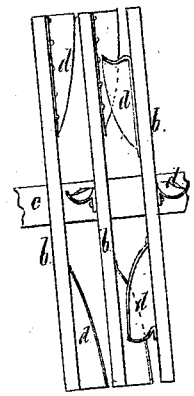
Witnesses:
Chas. H. Smith
Geo. D. Walker
J. W. Johnson Jr.
A. W. Goodell.
Lemuel W. Serrell
Atty.

United States Patent Office.

THOMAS W. JOHNSON, JR., AND ANTHONY W. GOODELL, OF NEW YORK, N. Y.

Letters Patent No. 108,793, dated November 1, 1870.

IMPROVEMENT IN APPARATUS FOR EVAPORATING AND CONCENTRATING BARK-EXTRACTS, &c.

The Schedule referred to in these Letters Patent and making part of the same.

*To all whom it may concern:*

Be it known that we, THOMAS W. JOHNSON, Jr., and ANTHONY W. GOODELL, of the city and State of New York, have invented and made a new and useful Improvement in Evaporating apparatus for Concentrating Bark-Extracts, &c.; and the following is declared to be a correct description thereof.

The watery portion of various extracts has heretofore been evaporated for concentration by means of disks of metal upon a shaft set to revolve, so that the disks are partially immersed, and the portion of said disks that is exposed to atmospheric influences increases the rapidity with which the concentration is effected, in consequence of the thin film that there is of the liquid upon said disks. These metal disks, however, are liable to become partially or entirely dry near the center portions, particularly as the liquid lessens by evaporation, and with some extracts, such as that of oak bark, the atmosphere, at ordinary temperatures, produces an acidity that is detrimental.

Our invention relates to the use of disks of wood, that revolve in a casing through which a current of heated air is directed. The wooden disks are more effective than metal, on account of slightly absorbing the liquid, and remaining constantly wet; and the casing in which the disks revolve is adapted to heating both the material and the air in the most economical manner, and at the same time avoiding a temperature that would injure the material by boiling.

In the drawing—

$a$ is the vessel to contain the extract to be concentrated, and $b\ b$ are the disks of wood attached to and revolving with the shaft $c$ by competent power.

In addition to the absorbent nature of the wooden disks we make use of the buckets $d\ d$, of small pieces of sheet metal, to lift up and pour upon the surfaces of the disks small quantities of the liquid to be concentrated by evaporation.

The casing $e$ containing the apparatus is to be of suitable size and shape, and within it, and below the vessel $a$, a stove, heater, or furnace, $f$, is introduced, with a smoke-flue, $g$.

Air is to be admitted to the case $e$ by dampers or registers, $h$, and circulates around the pipe $g$, up over the partition $k$, below the division $l$, around the stove or furnace, and up and between the revolving disks, and across over the vessel $a$, to the escape-flue or opening $m$.

We prefer to have the flue $g$ terminate slightly below the flue $m$, so that said flue $m$ conveys away both vapors and gases, and thereby the draught is increased, which causes a circulation of air through the apparatus, or the smoke-pipe may be led away in any other manner.

An opening with a cover, $n$, may be provided in the casing $e$ to observe the extract from time to time.

There may be a funnel, $r$, provided at the top of the case, to allow for pouring in the liquid to be concentrated, and a cock at $s$, for drawing off the liquid.

Gauges and thermometer can also be provided, as usual.

We claim as our invention—

1. The buckets, $d$, applied to and combined with the revolving disks $b$, as and for the purposes set forth.

2. The arrangement of the heating-stove, casing $e$, air passage-ways, vessel $a$, revolving disks $b$, and escape-flue or opening $m$, substantially as and for the purposes set forth.

In witness whereof we have hereunto set our signatures this 15th day of April, A. D. 1870.

THOS. W. JOHNSON, JR.
    ANTHONY W. GOODELL.

Witnesses:
 GEO. T. PINCKNEY,
 HAROLD SERRELL.